United States Patent
Dyer

(10) Patent No.: US 10,456,722 B2
(45) Date of Patent: Oct. 29, 2019

(54) INTEGRATED OXYGEN REMOVAL UNIT AND FUEL FILTER

(71) Applicant: Hamilton Sundstrand Corporation, Charlotte, NC (US)

(72) Inventor: Gerald P. Dyer, Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 264 days.

(21) Appl. No.: 15/686,330

(22) Filed: Aug. 25, 2017

(65) Prior Publication Data

US 2019/0060809 A1    Feb. 28, 2019

(51) Int. Cl.
| | |
|---|---|
| *B01D 50/00* | (2006.01) |
| *B01D 19/00* | (2006.01) |
| *B01D 36/00* | (2006.01) |
| *F02C 7/22* | (2006.01) |
| *B01D 29/35* | (2006.01) |
| *B01D 29/90* | (2006.01) |
| *B01D 46/00* | (2006.01) |
| *B01D 29/11* | (2006.01) |
| *F23K 5/18* | (2006.01) |

(52) U.S. Cl.
CPC .......... *B01D 36/001* (2013.01); *B01D 19/00* (2013.01); *B01D 19/0031* (2013.01); *B01D 19/0036* (2013.01); *B01D 29/117* (2013.01); *B01D 29/35* (2013.01); *B01D 29/902* (2013.01); *B01D 46/0023* (2013.01); *B01D 50/002* (2013.01); *F02C 7/22* (2013.01); *F02C 7/222* (2013.01); *F23K 5/18* (2013.01); *B01D 2201/02* (2013.01); *F05D 2210/42* (2013.01)

(58) Field of Classification Search
CPC ................ B01D 19/00; B01D 19/0031; B01D 19/0036; B01D 50/00; B01D 46/0023; B01D 50/002; B01D 36/001
USPC ............................................................ 96/10
See application file for complete search history.

(56) References Cited

U.S. PATENT DOCUMENTS

| | | | |
|---|---|---|---|
| 7,582,137 B2 * | 9/2009 | Chen .................. | B01D 19/0031 210/640 |
| 2005/0137441 A1 | 6/2005 | Cordatos et al. | |
| 2016/0167802 A1 | 6/2016 | Lo et al. | |

FOREIGN PATENT DOCUMENTS

FR    2999653 A1    6/2014

OTHER PUBLICATIONS

European Search Report for EP Application No. 18190472.3 dated Feb. 4, 2019.

* cited by examiner

*Primary Examiner* — Robert A Hopkins
(74) *Attorney, Agent, or Firm* — Carlson, Gaskey & Olds, P.C.

(57) ABSTRACT

A system for use in a gas turbine engine fuel supply has an internal fuel filter having an internal bore and an external surface. A chamber within the internal bore of the fuel filter for receives a fuel and allows fuel to pass radially outwardly across the fuel filter. An oxygen removal unit is outwardly of the external surface of the fuel filter, such that fuel passes through the fuel filter, encounters the oxygen removal unit such that oxygen can be removed from the fuel, an outlet port for removed oxygen, and a separate outlet port for fuel having passed over the fuel filter and the oxygen removal unit.

20 Claims, 3 Drawing Sheets

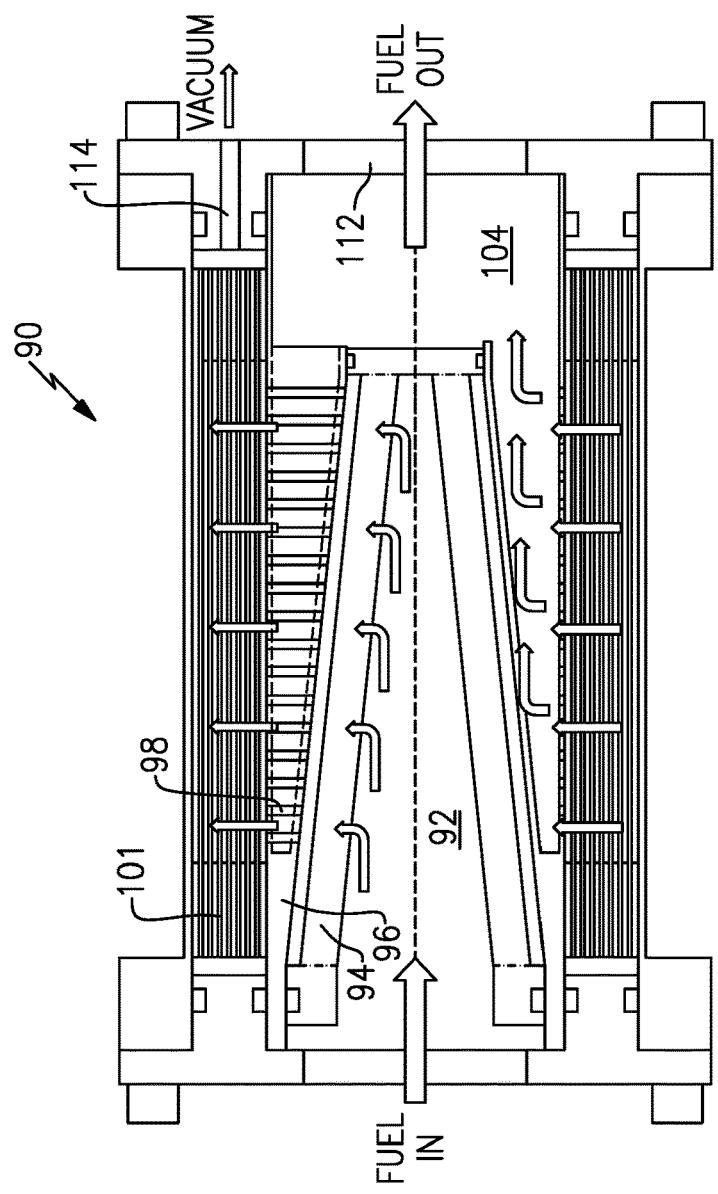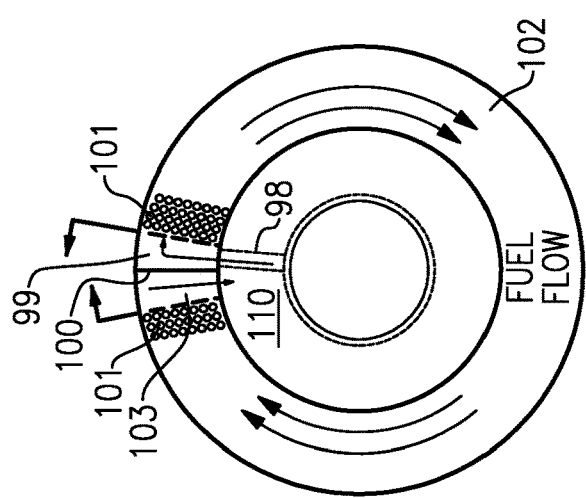
FIG. 3A
FIG. 3B

INTEGRATED OXYGEN REMOVAL UNIT AND FUEL FILTER

BACKGROUND OF THE INVENTION

This application relates to an integrated assembly including an oxygen removal unit for removing oxygen from fuel and a fuel filter.

Gas turbine engines are known and typically include a fuel delivery system for supplying fuel to a combustor. The fuel is mixed with air and ignited and products of this combustion provide power for driving components on the engine.

It is known that for a number of reasons the fuel should be filtered before being delivered into the combustion section. Thus, fuel filters are known.

More recently, it has been proposed to remove oxygen from the fuel to achieve more desirable combustion in the combustor.

Various types of oxygen removal units have been proposed.

In general, these two components have been provided in separate spaces and thus increase the overall volume of the engine.

SUMMARY OF THE INVENTION

A system for use in a gas turbine engine fuel supply has an internal fuel filter having an internal bore and an external surface. A chamber within the internal bore of the fuel filter for receives a fuel and allows fuel to pass radially outwardly across the fuel filter. An oxygen removal unit is outwardly of the external surface of the fuel filter, such that fuel passes through the fuel filter, encounters the oxygen removal unit such that oxygen can be removed from the fuel, an outlet port for removed oxygen, and a separate outlet port for fuel having passed over the fuel filter and the oxygen removal unit.

An engine is also disclosed.

These and other features may be best understood from the following drawings and specification.

BRIEF DESCRIPTION OF THE DRAWINGS

FIG. 3A shows another schematic.
FIG. 3B shows a flow detail of the FIG. 3A embodiment.

DETAILED DESCRIPTION

Figures 1A, 1B:
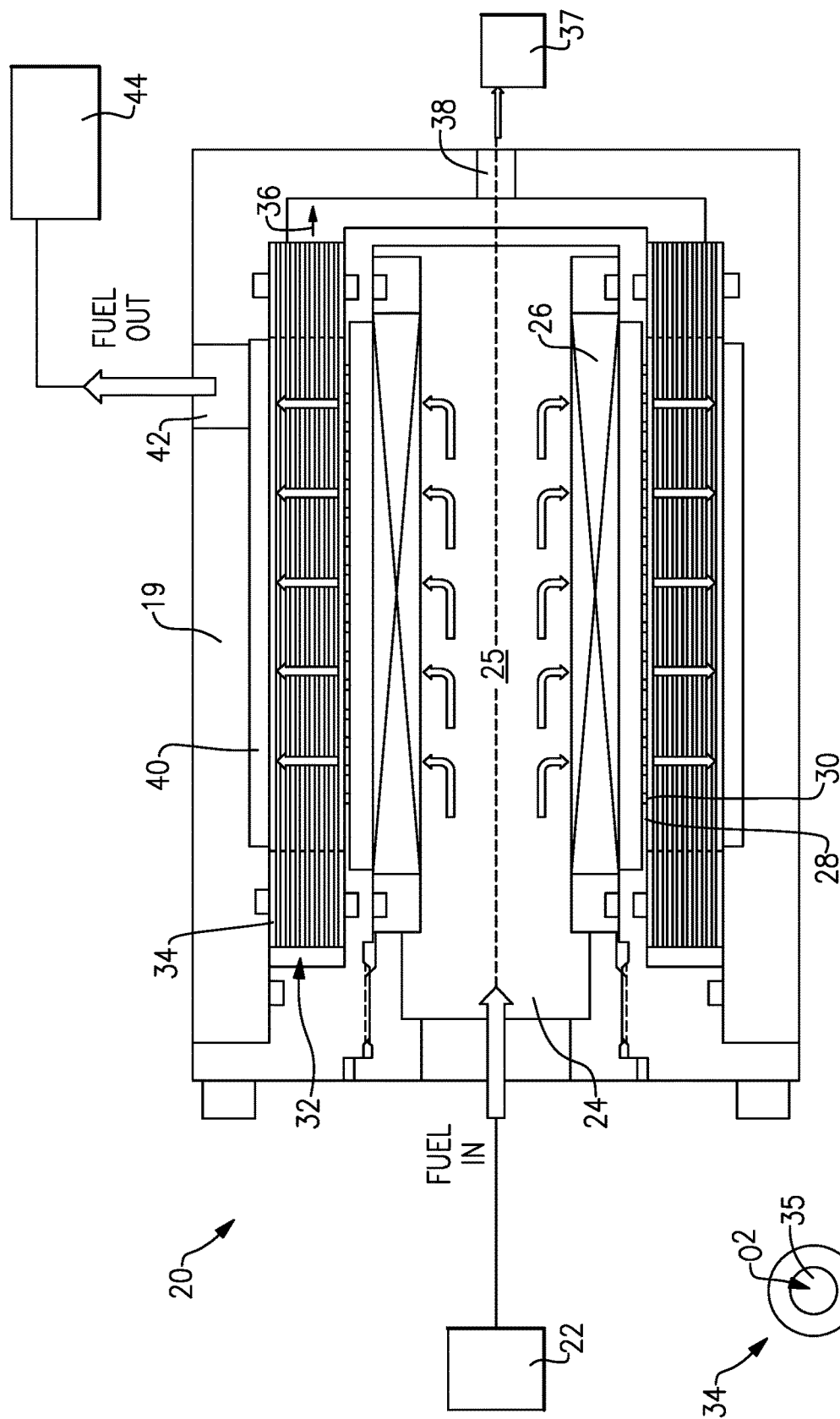
FIG. 1A shows a first schematic system.
FIG. 1B shows a detail of the oxygen removal system.

A fuel delivery system 20 includes a pump 22, shown schematically, delivering fuel into an internal bore 24 and a chamber 25. The chamber 25 is radially inward of a fuel filter 26. Fuel filter 26 may be structured as generally known. The fuel flows radially outwardly through the fuel filter 26 and through a housing portion 28 having a plurality of holes 30. The fuel flows outwardly across an oxygen removal unit 32 that may be provided by a plurality of hollow tube membranes 34.

While a particular arrangement is shown for the filter 26 and the oxygen removal unit 32, other arrangements would come within the scope of this disclosure In one sense, the disclosure relates to an integrated filter and oxygen removal unit with a housing 19 defining a fuel inlet, a fuel outlet and an oxygen outlet. A filter is positioned within the housing and configured to allow fuel to pass radially through the filter. An oxygen removal unit is positioned within the housing and configured to remove oxygen from fuel encountering the oxygen removal unit after the fuel has passed through the filter.

FIG. 1B schematically shows a single tube membrane 34. As known, oxygen $O_2$ dissolved within the fuel will pass through the membrane into an internal bore 35. As shown in this figure, the oxygen in bores 35 passes along a length of the tubes 34 to a chamber 36 and is removed by a vacuum source 37 positioned on a port 38. The structure of the tube 34 may be generally as known. Fuel having passed over the oxygen removal unit 32 reaches a chamber 40 and is then delivered outwardly through a port 42 to a gas turbine engine 44. As known, the fuel is delivered into a combustor in the gas turbine engine 44 and ignited.

Positioning the fuel filter 26 radially within the oxygen removal unit 32 provides a very efficient use of space.

In one embodiment, an outer periphery of the fuel filter 26 and an inner periphery are both cylindrical. The same is true in an embodiment of the oxygen removal system 32.

Figure 2A:
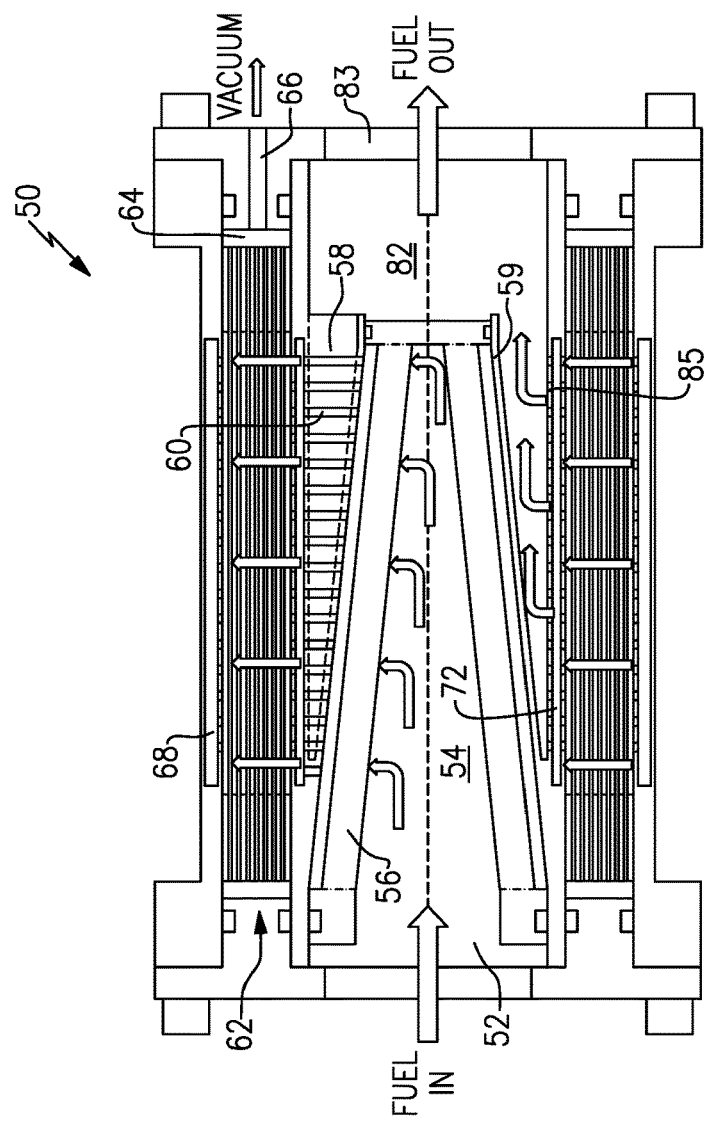
FIG. 2A shows a second schematic.

FIG. 2A shows an embodiment 50, which may be utilized with the fuel pump, gas turbine engine, and vacuum pump as in the FIG. 1A embodiment. In embodiment 50, fuel is delivered into a port 52 and a chamber 54. As shown, the fuel filter 56 has a frusto-conical outer periphery and an inner periphery. The fuel passes radially outwardly through the filter 56 and through ports 60 in housing member 58, which is only over a small circumferential portion of the fuel filter. In other locations, a closure plate 59 blocks flow outwardly of the fuel filter.

The fuel passing through the ports 60 passes across an oxygen removal unit 62, which may be constructed of hollow tubes as in the FIGS. 1A and 1B embodiments. Removed oxygen passes into a chamber 64 and to a port 66. The fuel passes into an outer chamber 68.

Figure 2B:
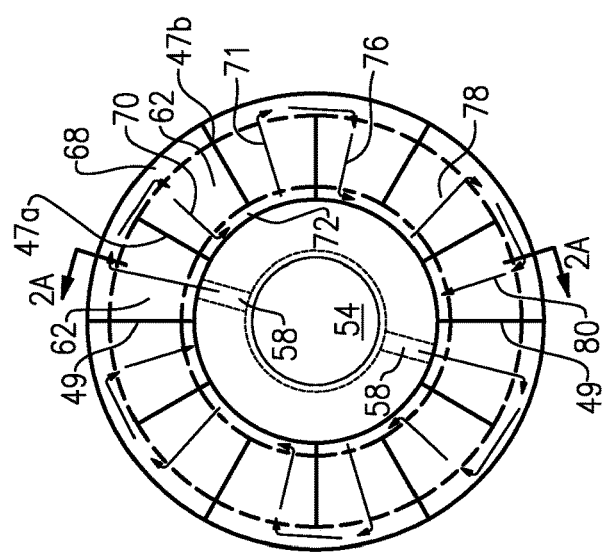
FIG. 2B is a cross-section through FIG. 2A and the relationship is shown by the lines 2A-2A as shown in FIG. 2B.

While the housing portion 58 is only shown over a limited circumferential portion, as can be appreciated from FIG. 2B, there is a generally opposed portion with ports 60. Radially extending plates 49 separate the flow between two circuits associated with ports 60.

One or more plates 47a and 47b may be disposed in a general radial direction to cause the flow to move radially outward and inward as the flow traverses in a circumferential path around the oxygen removal unit 62. For example, walls 47a and 47b can define a labyrinth path. Once the fuel flow from ports 60 located in housing portion 58 reaches the chamber 68, it extends back through the oxygen removal unit 62, as shown at 70, and returns to the chamber 72. Flow from the chamber 72 continues in a direction 71 back to the chamber 68. The flow then returns back inwardly through a flow direction 76 and back radially outwardly through direction 78 to a direction 80, and eventually again reaches the chamber 72. From the chamber 72, the flow passes through a plurality of holes 85, then reaches a chamber 82 and an outlet port 83 as shown in FIG. 2A. At the same time, a similar flow is ongoing on the opposed circumferential direction through a second set of ports 60.

Thus, this arrangement provides a very high degree of oxygen removal through the repeated passes.

Another embodiment 90 is illustrated in FIGS. 3A and 3B. This embodiment would also be utilized with the fuel pump, gas turbine engine, and vacuum pump of FIG. 1A.

A chamber 92 is again positioned within a frusto-conical fuel filter 94. A housing 96 includes ports 98. Ports 98 pass into a chamber 99 (see FIG. 3B) and then circumferentially across the oxygen removal unit 101 and its tubes. The fuel then passes circumferentially, again as shown in FIG. 3B, to an opposed chamber 103, separated from chamber 99 by a plate 100. In one embodiment, the circumferential distance between chambers 99 and 103 is full of tubes of oxygen removal unit 101.

Once reaching chamber 103, the fuel passes into a chamber 104 and through a port 112. Here again, a high degree of oxygen removal can be provided by increasing the flow of the fuel over a greater surface area of hollow tube membrane.

Removed oxygen is taken away through port 114.

While the oxygen removal unit is shown as hollow tube membranes, other types of oxygen removal systems may be considered within the several embodiments.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A system for use in a gas turbine engine fuel supply comprising:
   a housing defining a fuel inlet, a fuel outlet and an oxygen outlet;
   a filter positioned within the housing configured to allow fuel to pass radially through the filter; and
   an oxygen removal unit positioned within the housing configured to remove oxygen from fuel encountering the oxygen removal unit after the fuel has passed through the filter.

2. The system as set forth in claim 1, wherein said filter having an internal bore and an external surface, a chamber within said internal bore of said fuel filter for receiving fuel, and for allowing fuel to pass radially outwardly across said fuel filter, said oxygen removal unit positioned outwardly of said external surface of said fuel filter, such that fuel, having passed through said fuel filter, encounters said oxygen removal unit such that oxygen can be removed from the fuel, and an outlet port for removed oxygen, and a separate outlet port for fuel having passed over the fuel filter and the oxygen removal unit.

3. The system as set forth in claim 2, wherein said oxygen removal unit contains a plurality of hollow tubes, and said plurality of hollow tubes together form a generally cylindrical oxygen removal unit, with said fuel filter positioned radially inwardly of said oxygen removal unit.

4. The system as set forth in claim 3, wherein said fuel filter external surface is generally cylindrical and said fuel filter internal bore is also generally cylindrical.

5. The system as set forth in claim 3, wherein the external surface and the internal bore of said fuel filter are both generally frusto-conical.

6. The system as set forth in claim 3, wherein the fuel passing across said fuel filter unit generally across an entire circumference of said fuel filter unit and across said oxygen removal unit generally across an entire circumference.

7. The system as set forth in claim 2, wherein said fuel outlet is radially outwardly of a chamber which is radially outward of said oxygen removal unit and said removed oxygen passes into a chamber axially beyond said oxygen removal unit to said oxygen removal port.

8. The system as set forth in claim 2, wherein said fuel passes across and over a limited circumference of said oxygen removal unit to an outer chamber, and then returns back radially inwardly across another circumferential portion of said oxygen removal unit back to an inner chamber.

9. The system as set forth in claim 8, wherein there are a pair of opposed flow portions initially radially outwardly across said oxygen removal unit to said outer chamber and separated by separating plates.

10. The system as set forth in claim 2, wherein fuel passes initially across into a chamber circumferentially intermediate two circumferential ends of said oxygen removal unit, and then circumferentially across said oxygen removal unit to an opposed end of said oxygen removal unit and into a second chamber which communicates with said fuel outlet.

11. A gas turbine engine fuel supply system comprising:
    a fuel pump for delivering fuel into a housing defining a fuel inlet, a fuel outlet and an oxygen outlet;
    a filter positioned within the housing configured to allow fuel to pass radially through the filter;
    an oxygen removal unit positioned within the housing configured to remove oxygen from fuel encountering the oxygen removal unit after the fuel has passed through the filter; and
    a fuel line downstream of the oxygen removal unit and connected to a combustor.

12. The gas turbine engine fuel supply system as set forth in claim 11, wherein said filter having an internal bore and an external surface, a chamber within said internal bore of said fuel filter for receiving fuel, and for allowing fuel to pass radially outwardly across said fuel filter, said oxygen removal unit positioned outwardly of said external surface of said fuel filter, such that fuel, having passed through said fuel filter, encounters said oxygen removal unit such that oxygen can be removed from the fuel, and an outlet port for removed oxygen, and a separate outlet port for fuel having passed over the fuel filter and the oxygen removal unit.

13. The gas turbine engine fuel supply system as set forth in claim 12, wherein said oxygen removal unit contains a plurality of hollow tubes, and said plurality of hollow tubes together form a generally cylindrical oxygen removal unit, with said fuel filter positioned radially inwardly of said oxygen removal unit.

14. The gas turbine engine fuel supply system as set forth in claim 13, wherein said fuel filter external surface is generally cylindrical and said fuel filter internal bore is also generally cylindrical.

15. The gas turbine engine fuel supply system as set forth in claim 13, wherein the external surface and the internal bore of said fuel filter are both generally frusto-conical.

16. The gas turbine engine fuel supply system as set forth in claim 13, wherein the fuel passing across said fuel filter unit generally across an entire circumference of said fuel filter unit and across said oxygen removal unit generally across an entire circumference.

17. The gas turbine engine fuel supply system as set forth in claim 12, wherein said fuel outlet is radially outwardly of a chamber which is radially outward of said oxygen removal unit and said removed oxygen passes into a chamber axially beyond said oxygen removal unit to said oxygen removal port.

18. The gas turbine engine fuel supply system as set forth in claim 12, wherein said fuel passes across and over a limited circumference of said oxygen removal unit to an outer chamber, and then returns back radially inwardly across another circumferential portion of said oxygen removal unit back to an inner chamber.

19. The gas turbine engine fuel supply system as set forth in claim 18, wherein there are a pair of opposed flow portions initially radially outwardly across said oxygen removal unit to said outer chamber and separated by separating plates.

20. The gas turbine engine fuel supply system as set forth in claim 12, wherein fuel passes initially across into a chamber circumferentially intermediate two circumferential ends of said oxygen removal unit, and then circumferentially across said oxygen removal unit to an opposed end of said oxygen removal unit and into a second chamber which communicates with said fuel outlet.

\* \* \* \* \*